Sept. 2, 1958  R. G. BEGLE  2,850,332
WAY GUARD FOR MACHINE TOOLS
Filed Sept. 20, 1956  2 Sheets-Sheet 2

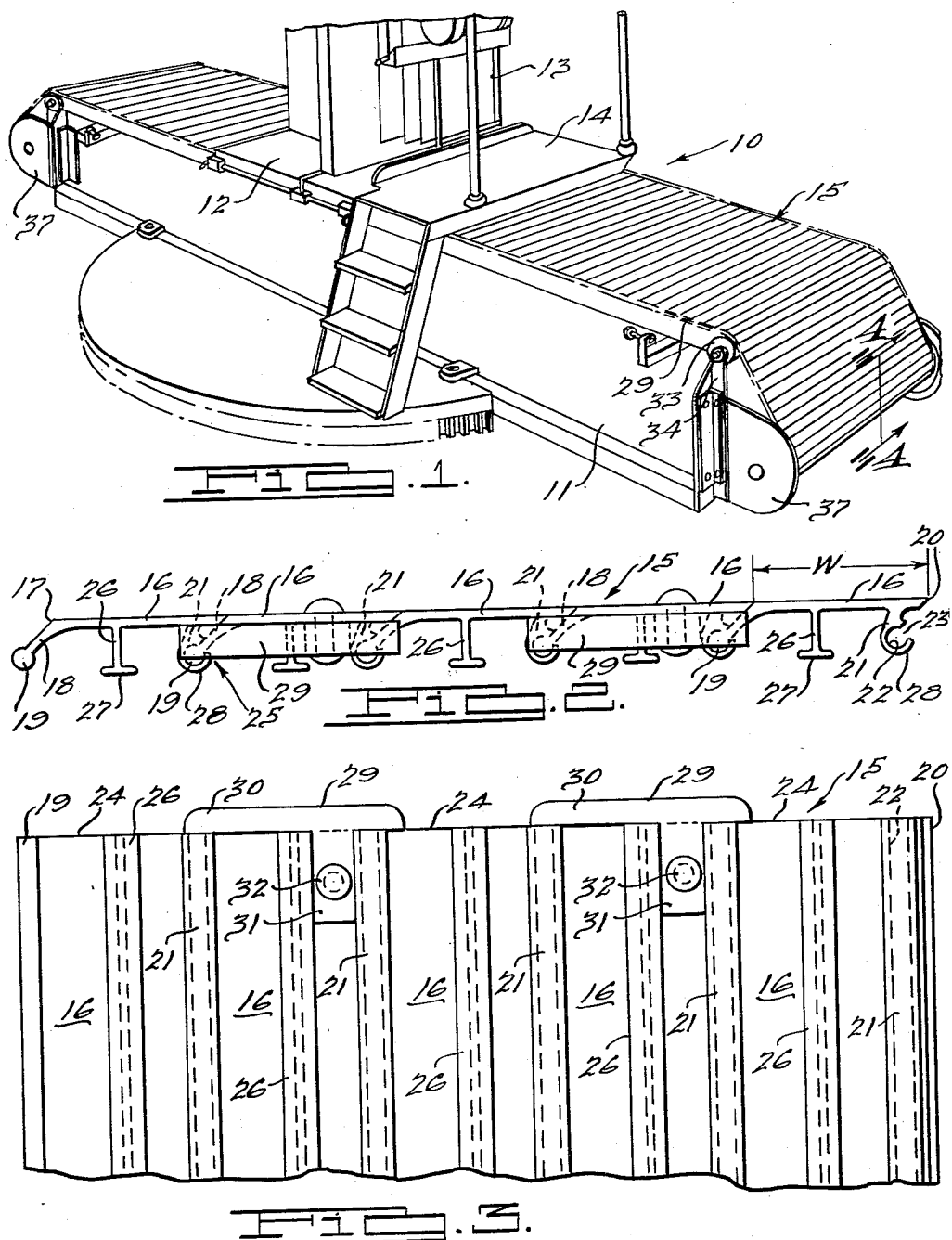

INVENTOR.
Robert G. Begle.
BY John Joseph Roethel
ATTORNEY.

United States Patent Office 2,850,332
Patented Sept. 2, 1958

2,850,332

WAY GUARD FOR MACHINE TOOLS

Robert G. Begle, Birmingham, Mich.

Application September 20, 1956, Serial No. 611,052

1 Claim. (Cl. 308—3.5)

This invention relates to way covers or way guards for machine tools.

It has long been recognized that machine ways and way mechanisms of machine tools, particularly those of boring mills, planers, large grinders, are vulnerable to clogging and damage from an accumulation of chips, grit or other foreign matter thereon. Way covers or way guards made of neoprene, canvas or flexible metal strips have been provided. But the use of such way covers has been found to have many attendant disadvantages. For example, way covers made of canvas or neoprene materials have a relatively short wear life, being particularly subject to being torn or to be burned through by hot chips falling on the surface. Flexible metal strips are easily dented when tools are dropped thereon, and, on larger machines particularly, are frequently damaged by persons attempting to step thereon.

It is an object of the present invention to provide a way cover adapted to be manufactured of extruded metal sections, the material preferably used being aluminum. More particularly, the way cover comprises inter-locking panels or strips adapted to be automatically compactly rolled up at either or both ends of the machine. The inter-locked panels or strips are reinforced so as to be sufficiently rigid to permit the machine operator to walk on the cover surface while the machine is idle or operating. This important feature facilitates machine servicing and job setup thereby providing a safer and more productive operation.

Other objects and features of the present invention will appear in the following description and independent claim, reference being had to the accompanying drawings forming a part of the specification wherein like reference characters designate corresponding parts in the several views.

Fig. 1 is a fragmentary perspective view of a machine tool showing the application of the way cover embodying the present invention thereto.

Fig. 2 is a side elevation of a fragmentary portion of the way cover.

Fig. 3 is a bottom elevation of Fig. 2.

Figure 4:
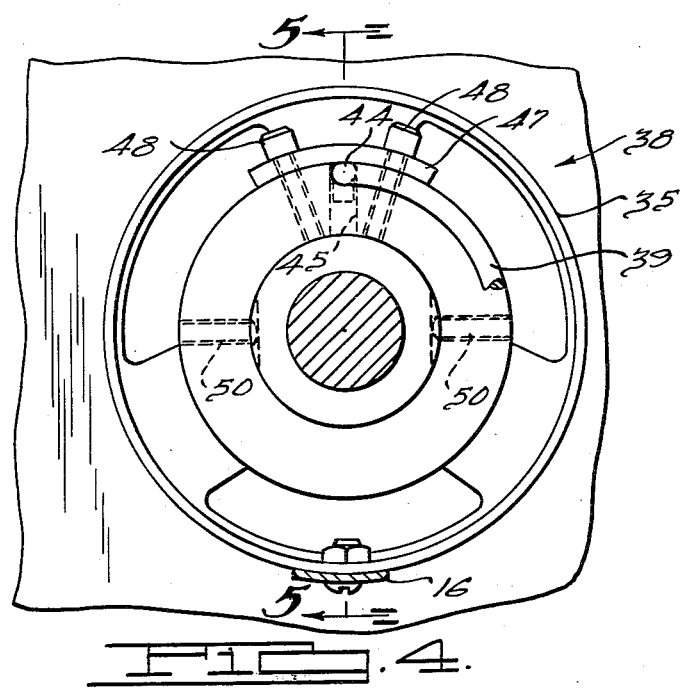
Fig. 4 is a section taken substantially through line 4—4 of Fig. 1 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

As shown in Fig. 1, the illustrated embodiment of the present invention is shown mounted on the base or bed structure of a large boring mill. The boring mill 10 comprises a bed 11 upon which is formed spaced horizontal ways (not shown) extending longitudinally of the bed. The ways slidably support and guide a carriage or slide 12 which carries the column 13 on which the tool head (not shown) is adjustably mounted. The carriage or slide 12 of the illustrated machine also carries a platform 14 on which the machine operator may stand to operate the machine and to make necessary adjustments.

The ways and way mechanism of the illustrated machine 10 are not visible since they are covered by the way cover or way guard, generally designated 15, embodying the present invention. It will be readily apparent that if a way guard or way cover were not provided, the ways and way mechanism would receive a deposit of chips, grit and foreign material as the cutting tool does its work. Then, as the carriage 12 traverses the machine bed 11, the relatively soft ways are in danger of being scored as the chips and the like are caught between the carriage and way surfaces. Further, the way mechanism is subject to clogging or damage from the deposits thereon.

Way covers of canvas or other material such as neoprene have been used but have found to have generally too short a wear life to be practicable. Hot chips falling on the exposed surface burn or melt through the materials. Further, the materials tear readily. It has also been proposed to use flexible metal strips. In order for the metal to be rollable at the ends of the machine a relatively thin gage metal has to be used. When tools or other heavy objects are inadvertently dropped thereon, the metal bends or even tears. Further, when used on large machines such as that illustrated in Fig. 1, the metal strips provide a deceptive appearance of rigidity inviting the machine operator to step thereon to reach parts of the workpiece supporting fixture or of the machine itself to make adjustments. The result is damage to the way cover and oftentimes injury to the machine operator as the way cover buckles beneath his weight.

The way guard 15 embodying the present invention comprises a series of inter-locked panels or strips 16, which preferably are extruded of aluminum. The panels or strips 16 are of any convenient width, the width referring to the dimension W indicated in Fig. 2. For a machine of the size of the boring mill 10 a width W of 1½ inches has been found convenient. The length of the strips or panel 16 is of a dimension sufficient to span the width of the machine bed or, the width of the machine ways if the width of the ways is less than the width of the machine bed, on which the way cover is to be used.

Referring now to Fig. 2, it will be noted that each strip or panel 16 is provided on one edge 17 with an angularly inclined depending rib 18 terminating in a cylindrical appendage 19. Rib 18 and its appendage 19 extend the length of the panel or strip 16. At its opposite edge 20, each strip or panel is provided with a second rib 21 provided with a groove 22 complementary to the cylindrical appendage 19. The opening 23 of the groove 22 is somewhat wider than the thickness of the rib 18 but is somewhat smaller than the diameter of the cylindrical appendage 19.

The strips 18 are assembled by sliding the cylindrical appendage 19 on one strip edge into the receiving groove 22 on the edge 20 of a second strip 16. The strips are then moved longitudinally relative to one another until the respective end edges 24 are in alignment, as shown in Fig. 3. As seen by looking in the direction 25 in Fig. 2, the extra width of the groove opening 23 lies below the rib 18 when the adjacent strips 16 present a flat upper surface. This arrangement permits relative movement of the one strip to the other about the coincidence axes of the cylindrical appendage 19 and cylindrical groove 22, thus permitting the way cover 15 to be rolled. As was stated, the width of the groove opening 23 is smaller than the diameter of the cylindrical appendage 19 adapted to be received therein. Thus, the adjacent strips 16 are interlocked against being separated in a direction normal to the direction in which they were moved for assembly.

Each strip 16 is provided intermediate its two ribs 18 and 21 with a depending rib 26 of inverted T shape. The rib 26 extending for the full length of the strips 16 provides additional longitudinal reinforcement. It will be noted that the bottom surface 27 of the head portion of the rib 26 is in alignment with the bottom surface 28 of the rib 21, see Fig. 2. These two surfaces are the ones which rest upon the surface of the machine bed ways.

The strips 16 are held against longitudinal movement relative to each other by means of retaining devices 29 having a substantially T-shaped appearance. The head 30 of the retaining device 29 lies along the edge 24 of the strip 16 and is of sufficient length to cover a pair of inter-locking connections between ribs. As shown in Fig. 2, two retaining devices are sufficient to maintain five strips 16 in inter-locked relationship, that is, two retaining devices on each side of the way cover. As illustrated in Fig. 3, the leg portion 31 is inserted between a reinforcing rib 26 and a groove carrying rib 21 and riveted by rivets 32 to the strip 16.

It will be understood that two way covers 15 are provided for each machine. One end of each way cover 15 is secured in any convenient manner to the slide or carriage 12. From the point of attachment of the way covers to the carriage or slide 12, the way covers extend over rollers 33 mounted on the upper ends of brackets 34. After passing over the rollers 33 each way cover extends downwardly where the end thereof is secured to spaced pulleys 35 journalled on a shaft 36. The shaft 36 is non-rotatably journalled in brackets 37 fastened to the end of the machine as shown in Fig. 1.

Figure 5:
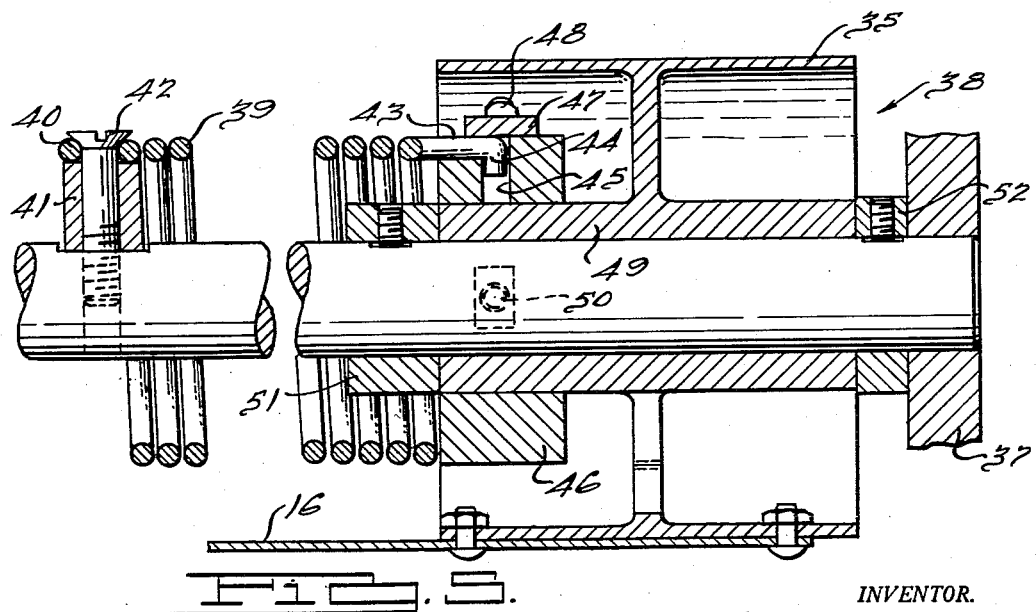
Fig. 5 is a section taken substantially through line 5—5 of Fig. 4 looking in the direction of the arrows.

Referring now to Figs. 4 and 5 there is illustrated a preferred form of a takeup mechanism, generally designated 38, for causing the way cover 15 on each side of the carriage 12 to be wound or taken up about the shaft 36 as the carriage moves toward that end of the machine. The takeup mechanism 38 comprises a coil spring 39 surrounding and extending longitudinally of the shaft 36. One end of the spring, the end 40 is fixedly secured to the shaft intermediate the ends thereof as by means of a spacer 41 and bolt 42, the end 40 of the spring being provided with a suitable loop which is hooked around the bolt 42. The other end of the spring, the end 43, is provided with a longitudinally extending hook portion 44 adapted to be hooked into a slot 45 and a collar 46. A suitable hold down clamp plate 47 held to the periphery of the collar 46 by bolts 48 is provided to maintain the hook portion 44 of the spring end 43 within the retaining slot 45. The collar 46 is non-rotatably held on the hub 49 of the pulley 35 by means of set screws 50, as shown in Fig. 4.

As shown in Fig. 5, a suitable collar 51 is positioned inwardly of the hub 35 to maintain the same in its proper position on the shaft against the pull being exerted by the spring as it is being wound up. The collar 52 shown on the right hand side of the pulley 35 is merely a spacer to prevent the pulley from rubbing against the side of bracket 37.

It will be understood that each spring 39 at each end of the machine is wound or mounted so that it is continually tending to exert a pull on the way cover to cause the way cover to be wound around the respective pulleys associated therewith. Thus, as the slide moves along the ways one way cover is being extended against the resistance of its associated spring while the slack in the other way cover is being taken up by the action of the spring.

Although the way cover embodying the present invention is intended for use principally on boring mills, planers, large grinders and vertical milling machines, it will be readily apparent that the covers are adaptable to many traveling operations where support, protection and safety are desired. The cover being made of interlocked aluminum panels or strips of suitably reinforced design are sufficiently rigid to permit the machine operator to walk on the covers while their machine is operating or idle. The manufacturer of the panels or strips by the extruding process makes the metal relatively tough and durable so that even if tools or other heavy objects are inadvertently dropped on the surface of the way cover, the surface will not show more than a slight nick or dent insufficient to interfere with the operation of the way cover. By virtue of the inter-locking construction of the strips which permit the strips to present a relatively flat smooth upper surface, any chips or other foreign material which might drop on to the way cover will be carried to the end of the machine and dropped off on to the floor. It will be readily apparent that even if the chips are hot when they hit the way cover, they cannot burn the surface of the way cover.

I claim:

A way guard for a machine tool embodying a base structure having guide ways thereon and a reciprocable table slidable on said ways, said way guard comprising a series of interlocked strips of metal, each strip being of a length long enough to extend over the machine ways and being of relatively narrow width, each strip having at one edge thereof a longitudinally depending rib carrying a cylindrical appendage and at the opposite edge thereof a longitudinally extending rib having a groove therein complementary to the cylindrical appendage, whereby when a cylindrical appendage on one strip is seated in a groove on a second strip an interlocked connection is provided, said interlocked connection permitting the interlocked strips to provide a way guard having a flat upper surface when overlying the machine ways while preventing the strips from being disengaged from each other in a direction longitudinally of the machine base, said interlocked connection having means to permit adjacent strips to swing about their axis of connection whereby the guard may be rolled, each strip being provided with a reinforcing rib intermediate the edge ribs to increase the rigidity of said way cover whereby the same may support the weight of a person walking thereon, the bottom surface of said cylindrical appendage and said reinforcing rib lying in a common plane of contact with said machine ways when the upper surface is flat, and retaining means carried at the ends of said strips to prevent displacement of one strip relative to the other in the direction of the longitudinal axis of said one strip.

References Cited in the file of this patent

UNITED STATES PATENTS

| | | |
|---|---|---|
| 926,139 | Rush | June 29, 1909 |
| 1,140,236 | Ayres | May 18, 1915 |
| 1,643,074 | Lavignino | Sept. 20, 1927 |
| 1,720,850 | Negrini | July 16, 1929 |
| 2,116,847 | Pilcher | May 10, 1938 |
| 2,428,887 | Munro | Oct. 14, 1947 |
| 2,551,860 | Welte et al. | May 8, 1951 |